(12) United States Patent
Ji et al.

(10) Patent No.: US 11,935,441 B2
(45) Date of Patent: Mar. 19, 2024

(54) APPARATUS FOR CONTROLLING DISPLAY OF VEHICLE AND METHOD THEREOF

(71) Applicants: HYUNDAI MOTOR COMPANY, Seoul (KR); Kia Corporation, Seoul (KR); Anyractive.co.,Ltd, Seoul (KR)

(72) Inventors: Chang Jin Ji, Seoul (KR); Min Han Kim, Anyang-si (KR); Yong Lee, Seongnam-si (KR); Sung Hyun Lim, Seoul (KR)

(73) Assignees: HYUNDAI MOTOR COMPANY, Seoul (KR); KIA CORPORATION, Seoul (KR); ANYRACTIVE.CO., LTD., Seoul (KR)

( * ) Notice: Subject to any disclaimer, the term of this patent is extended or adjusted under 35 U.S.C. 154(b) by 86 days.

(21) Appl. No.: 17/741,418

(22) Filed: May 10, 2022

(65) Prior Publication Data

US 2023/0039608 A1 Feb. 9, 2023

(30) Foreign Application Priority Data

Aug. 4, 2021 (KR) .................. 10-2021-0102737

(51) Int. Cl.
*G09G 3/00* (2006.01)
*B60K 35/00* (2006.01)
(Continued)

(52) U.S. Cl.
CPC ............. *G09G 3/001* (2013.01); *B60K 35/00* (2013.01); *G06F 3/017* (2013.01); *G06F 3/1454* (2013.01); *G06F 3/167* (2013.01); *G10L 17/22* (2013.01); *H04R 3/00* (2013.01); *B60K 35/10* (2024.01); *B60K 35/22* (2024.01); *B60K 35/26* (2024.01); *B60K 2360/146* (2024.01); *B60K 2360/148* (2024.01); *G02B 5/32* (2013.01); *G09G 2300/023* (2013.01); *G09G 2354/00* (2013.01);
(Continued)

(58) Field of Classification Search
CPC .. G02B 5/32; G10L 17/22; H04R 3/00; H04R 2499/13; G06F 3/017; G06F 3/1454; G06F 3/167; G09G 3/001; G09G 2300/023; G09G 2354/00; G09G 2380/10; B60K 35/00; B60K 2370/146; B60K 2370/148; B60K 2370/152; B60K 2370/157
USPC .......................................................... 345/633
See application file for complete search history.

(56) References Cited

U.S. PATENT DOCUMENTS 8,451,111 B2   5/2013 Sasaki et al.
2003/0147024 A1*  8/2003 Wang ................ G02F 1/133621
                                                    349/61

(Continued)

FOREIGN PATENT DOCUMENTS

JP         4852062 B2    1/2012
KR    10-2019-0011944 A  2/2019

*Primary Examiner* — Jacinta M Crawford
(74) *Attorney, Agent, or Firm* — Morgan, Lewis & Bockius LLP (57) ABSTRACT

The present disclosure relates to an apparatus for controlling a multi-image display provided in a vehicle, and a method thereof. According to the present disclosure, a multi-image display device may simultaneously output two or more images separated depending on an output angle or an optical frequency, and a first reflection member provided in an indoor ceiling of the vehicle may reflect one image among the two or more images output from the multi-image display device.

19 Claims, 9 Drawing Sheets

(51) Int. Cl.
*G02B 5/32* (2006.01)
*G06F 3/01* (2006.01)
*G06F 3/14* (2006.01)
*G06F 3/16* (2006.01)
*G10L 17/22* (2013.01)
*H04R 3/00* (2006.01)

(52) U.S. Cl.
CPC ..... *G09G 2380/10* (2013.01); *H04R 2499/13* (2013.01)

(56) References Cited

U.S. PATENT DOCUMENTS

| | | |
|---|---|---|
| 2011/0001639 A1 | 1/2011 | Sasaki et al. |
| 2019/0187475 A1 | 6/2019 | Omanovic et al. |
| 2019/0189705 A1* | 6/2019 | Yang .................... H10K 59/122 |
| 2020/0290513 A1* | 9/2020 | Karafin .............. G02B 27/0103 |
| 2021/0072701 A1* | 3/2021 | Lee .......................... G03H 1/26 |

* cited by examiner

APPARATUS FOR CONTROLLING DISPLAY OF VEHICLE AND METHOD THEREOF

CROSS-REFERENCE TO RELATED APPLICATION

This application claims the benefit of priority to Korean Patent Application No. 10-2021-0102737, filed in the Korean Intellectual Property Office on Aug. 4, 2021, the entire contents of which are incorporated herein by reference.

TECHNICAL FIELD

The present disclosure relates to a vehicle display control apparatus and a method thereof, and more particularly, relates to an apparatus for controlling a multi-image display provided in a vehicle, and a method thereof.

BACKGROUND

Autonomous driving refers to a technology in which a vehicle drives itself to a destination while a driver does not directly drive the vehicle. Autonomous driving technology is continuously being developed. Ultimately, the technology for fully autonomous driving capable of responding to all situations without a driver is being developed. When the fully-autonomous driving is commercialized, a vehicle's passengers may spend their driving time without boredom while the passengers enjoy video-based content inside the vehicle while the vehicle is being driven. Accordingly, various entertainment-related technologies within the vehicle are being developed in preparation for the completion of fully-autonomous driving.

Besides, vehicles that have recently produced are provided with various systems to provide content to a rear seat passenger during driving even though the vehicle is not driven. As such, it is necessary to develop a technology such as a display capable of providing satisfaction to passengers as a technology for providing vehicle passengers with entertainment elements has been recently important.

SUMMARY

The present disclosure has been made to solve the above-mentioned problems occurring in the prior art while advantages achieved by the prior art are maintained intact.

An aspect of the present disclosure provides an apparatus for controlling a multi-image display provided in a vehicle, and a method thereof.

Another aspect of the present disclosure provides a vehicle display control apparatus that increases driving satisfaction of a rear seat passenger by providing an image to the rear seat passenger of a vehicle without providing a display on a back surface of a front seat headrest of the vehicle, and a method thereof.

Another aspect of the present disclosure provides a vehicle display control apparatus that increases interior openness depending on future mobility trends and provides image content, and a method thereof.

Another aspect of the present disclosure provides a vehicle display control apparatus that provides an image to a rear seat passenger by using a multi-image display without adding additional hardware, and a method thereof.

Another aspect of the present disclosure provides a vehicle display control apparatus that expands entertainment elements during driving by outputting an image capable of being viewed by a rear seat passenger inside a vehicle, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle display control apparatus may include a multi-image display device provided in a vehicle and simultaneously outputting two or more images separated depending on an output angle or an optical frequency to two or more locations, respectively, a first reflection member provided in an indoor ceiling of the vehicle and reflecting one image among the two or more images output from the multi-image display device, and a controller controlling the multi-image display device.

In an embodiment, the first reflection member may include a transmissive holographic optical element (HOE) film.

In an embodiment, the multi-image display device may include a barrier for separating the two or more images, which are output, depending on the angle.

In an embodiment, the multi-image display device may include a first display without a polarizing film, which is transparent, configured to output a first image, a second display positioned on a back surface of the first display and outputting a second image, and a light control film (LCF) interposed between the first display and the second display. The first reflection member may include a polarizing film for selectively reflecting one image among the first image and the second image.

In an embodiment, the controller may deactivate an output of an image, which is reflected on the first reflection member, from among the two or more images when an emergency is detected while the vehicle is autonomously driving.

In an embodiment, the controller may deactivate an output of an image, which is reflected on the first reflection member, from among the two or more images based on a time remaining to a destination while the vehicle is driving.

In an embodiment, the vehicle display control apparatus may further include a speech recognition device provided in the vehicle and recognizing a voice of a user. The controller may control the multi-image display device in response to the recognized voice.

In an embodiment, the vehicle display control apparatus may further include a camera device provided in the vehicle and capturing an image including a gesture of a user. The controller may control the multi-image display device in response to the gesture recognized through the image.

In an embodiment, the controller may be paired with a communication terminal of a user and may output content provided by the communication terminal through the multi-image display device, and may output a sound corresponding to a sound signal provided by the communication terminal through a speaker of the vehicle or an external wireless earphone.

In an embodiment, the controller may output an image associated with a driving situation or an image associated with navigation information in a direction of a driver seat of the vehicle through the multi-image display device and may output an entertainment-related image in a direction toward the first reflection member through the multi-image display device.

In an embodiment, the controller may output one or more of images mirrored with a communication terminal of a user, an embedded image embedded in advance in the vehicle, a terrestrial digital multimedia broadcasting (DMB) image, or an image stored in a removable storage device connected to the vehicle through the multi-image display device.

In an embodiment, the vehicle display control apparatus may further include a second reflection member provided in a windshield of the vehicle and reflecting the one image among the two or more images output from the multi-image display device. The controller may tilt the multi-image display device such that the one image among the two or more images is reflected on the second reflection member, when the vehicle is autonomously driving or is stopped.

In an embodiment, the first reflection member may include a color-changeable film. The controller may control the color-changeable film to change a color of the first reflection member to a predetermined color when an image reflected on the first reflection member through the multi-image display device is output.

According to an aspect of the present disclosure, a vehicle display controlling method may include simultaneously outputting, by a multi-image display device that is provided in a vehicle and is controlled by a controller, two or more images, which are separated depending on an output angle or an optical frequency to two or more locations, respectively and reflecting, by a first reflection member provided in an indoor ceiling of the vehicle, one image among the two or more images output from the multi-image display device.

In an embodiment, the vehicle display controlling method may further include deactivating, by the controller, an output of an image, which is reflected on the first reflection member, from among the two or more images when an emergency is detected while the vehicle is autonomously driving.

In an embodiment, the vehicle display controlling method may further include deactivating, by the controller, an output of an image, which is reflected on the first reflection member, from among the two or more images based on a time remaining to a destination while the vehicle is driving.

In an embodiment, the vehicle display controlling method may further include recognizing, by a speech recognition device provided in the vehicle, a voice of a user and controlling, by the controller, the multi-image display device in response to the recognized voice.

In an embodiment, the vehicle display controlling method may further include capturing, by a camera device provided in the vehicle, an image including a gesture of a user and controlling, by the controller, the multi-image display device in response to the gesture recognized through the image.

In an embodiment, the simultaneously outputting, by the multi-image display device, the two or more images separated depending on the output angle or the optical frequency may include outputting, by the multi-image display device, an image associated with a driving situation or an image associated with navigation information in a direction of a driver seat of the vehicle and outputting, by the multi-image display device, an entertainment-related image in a direction toward the first reflection member.

In an embodiment, the vehicle display controlling method may further include tilting, by the controller, the multi-image display device such that the one image among the two or more images is reflected on the second reflection member, when the vehicle is autonomously driving or is stopped and reflecting, by the second reflection member, the one image among the two or more images output from the multi-image display device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present invention will be described in detail with reference to the accompanying drawings. In adding reference numerals to components of each drawing, it should be noted that the same components have the same reference numerals, although they are indicated on another drawing. Furthermore, in describing the embodiments of the present disclosure, detailed descriptions associated with well-known functions or configurations will be omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 8.

Figure 1:
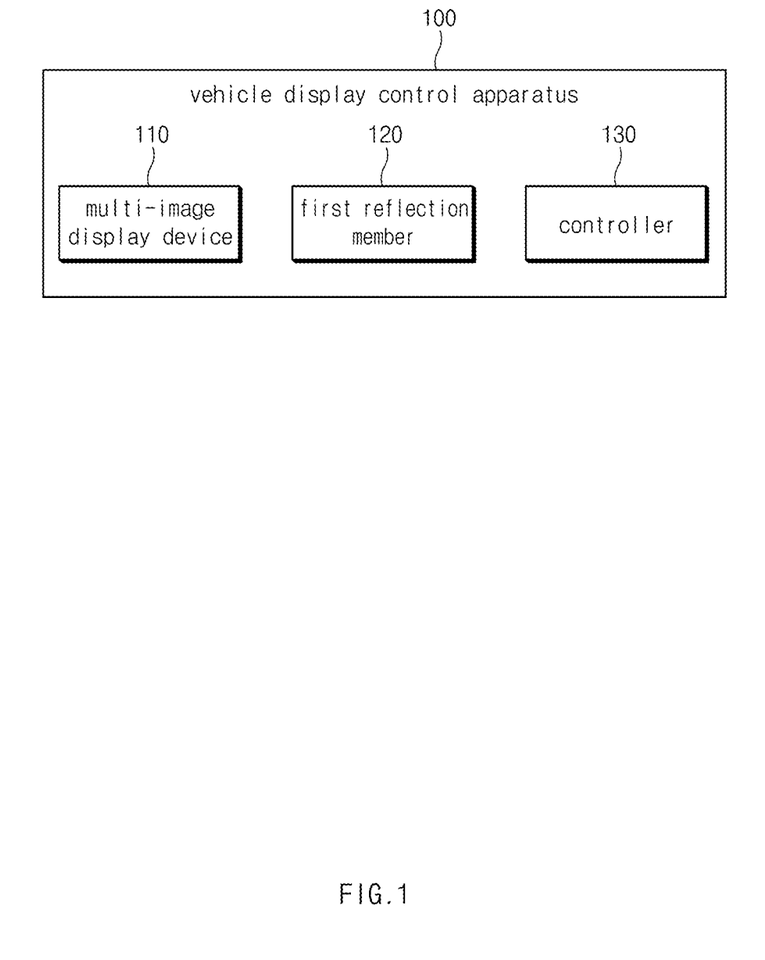
FIG. 1 is a block diagram illustrating a vehicle display control apparatus, according to an embodiment of the present disclosure.

FIG. 1 is a block diagram illustrating a vehicle display control apparatus, according to an embodiment of the present disclosure.

Referring to FIG. 1, a vehicle display control apparatus 100 may include a multi-image display device 110, a first reflection member 120, and a controller 130.

The vehicle display control apparatus 100 according to an embodiment of the present disclosure may be implemented inside a vehicle. At this time, the vehicle display control apparatus 100 may be integrally formed with internal control units of the vehicle; and, the vehicle display control apparatus 100 may be implemented as a separate hardware device and may be connected to control units of the vehicle by a connection means.

For example, the vehicle display control apparatus 100 may be implemented integrally with a vehicle or may be implemented in a form installed/attached to the vehicle as a configuration separate from the vehicle. Alternatively, a part of the vehicle display control apparatus 100 may be implemented integrally with the vehicle, and the other parts may be implemented in a form installed/attached to the vehicle as a configuration separate from the vehicle.

The multi-image display device 110 is provided in a vehicle so as to simultaneously output two or more images separated depending on an output angle or optical frequency.

For example, the multi-image display device 110 may be electrically controlled through the controller 120.

For example, the multi-image display device 110 may include a barrier for separating two or more images, which are to be output, depending on an angle.

For example, the multi-image display device 110 may be implemented through a display of Audio, Video, Navigation (AVN) provided in the vehicle.

For example, through a barrier mounted in a liquid crystal state in front of the display panel, the multi-image display device 110 may output two or more images, which are separated differently depending on a location at which a user watches a display or which have a limited visible area.

As another example, the multi-image display device 110 may separate and output images through a light control film (LCF) and a plurality of displays including transparent displays.

A process, in which the multi-image display device 110 separates images through a barrier, and a process, in which the multi-image display device 110 separates images through a plurality of displays including transparent displays and LCF will be in detail described later with reference to FIGS. 5A and 5B.

Furthermore, the multi-image display device 110 may be connected to a center fascia of the vehicle so as to be tiltable with respect to a central axis through a hinge.

In another embodiment, the multi-image display device 110 may be connected to a location other than the center fascia of the vehicle.

The first reflection member 120 is provided on an indoor ceiling of the vehicle such that one image among two or more images output from the multi-image display device 110 is capable of being reflected.

For example, the first reflection member 120 may be configured to be included in a vision roof (glass) provided on an indoor ceiling of the vehicle.

For example, the first reflection member 120 may include a transmissive holographic optical element (HOE) film.

In detail, the first reflection member 120 may operate as a concave mirror by using a fresnel scheme through a transmissive HOE film.

The first reflection member 120 may reflect and enlarge an image output from the multi-image display device 110 such that a rear seat passenger is capable of watching the reflected image.

For example, the transmissive HOE film is configured to have a transmittance of 95%, and may include a micro-tunable mirror having a concave mirror effect inside the transmissive HOE film.

Here, a ratio of 95% is an arbitrarily set value for the purpose of illustration, and may actually have other transmittances.

As another example, the first reflection member 120 may include a polarizing film.

The polarizing film included in the first reflection member 120 may reflect only an image of a specific frequency.

The controller 130 may perform overall control such that each of the components is capable of normally performing functions of the components. The controller 130 may be implemented in the form of hardware, may be implemented in the form of software, or may be implemented in the form of the combination of hardware and software. Favorably, the controller 130 may be implemented as a microprocessor, but is not limited thereto. In addition, the controller 130 may perform various data processing and calculations that will be described later.

The controller 130 may control the multi-image display device 110.

For example, the controller 130 may control the multi-image display device 110 to be turned on or off and may control an image output through the multi-image display device 110. Moreover, the controller 130 may control a hinge part, which is electrically controlled and which tilts the multi-image display device 110 with respect to a central axis.

For example, when an emergency is detected while the vehicle is autonomously driving, the controller 130 may deactivate an output of an image, which is reflected by the first reflection member 120, from among two or more images output through the multi-image display device 110.

When a vehicle is equipped with an autonomous driving function, the controller 130 may obtain information about whether the vehicle is autonomously driving and whether an emergency is detected during autonomous driving, through the vehicle's autonomous driving system.

For example, when an emergency is detected while the vehicle is autonomously driving, the controller 130 may stop an output of an image, which is output in a direction toward the first reflection member 120 and then is reflected by the first reflection member 120, from among the two or more images output through the multi-image display device 110 and may continuously output images output in another direction.

In this way, when an emergency is detected while the vehicle is autonomously driving, the controller 130 may stop the output of the image reflected by the first reflection member 120 through the multi-image display device 110. Accordingly, the controller 130 draws the attention of a passenger who was concentrating on the content through the image reflected by the first reflection member 120 from a driver seat or a rear seat, and may help the passenger focus on a driving situation.

For example, when an emergency is detected while the vehicle is autonomously driving, the controller 130 may deactivate an output of an image, which is reflected by the first reflection member 120, from among two or more images output through the multi-image display device 110, based on a time remaining to a destination while the vehicle is driving.

For example, the controller 130 may be connected to a vehicle's navigation system or autonomous driving system so as to obtain information about the time remaining to the destination during autonomous or manual driving of the vehicle.

For example, when the time remaining to the destination reaches a predetermined specific time, the controller 130 may deactivate an output of an image, which is reflected by the first reflection member 120, from among two or more images output through the multi-image display device 110.

For example, when the time remaining to the destination reaches the predetermined specific time, the controller 130 may stop an output of an image, which is output in a direction toward the first reflection member 120 and then is reflected by the first reflection member 120, from among the two or more images output through the multi-image display device 110 and may continuously output images output in another direction.

In this way, when the vehicle approaches the destination as the time remaining to the destination reaches the predetermined specific time, the controller 130 may stop the output of the image reflected by the first reflection member 120 through the multi-image display device 110. Accordingly, the controller 130 draws the attention of a passenger who was concentrating on the content through the image reflected by the first reflection member 120 from a driver seat or a rear seat, and may help the passenger focus on the remaining driving situation.

For example, the controller 130 may be paired with a user's communication terminal so as to output an image of the communication terminal through the multi-image display device 110.

For example, the controller 130 may output the sound of the communication terminal through the vehicle's speaker or an external wireless earphone.

For example, the controller 130 may be paired with a user's communication terminal through a separate short-range communication module provided in the vehicle performing short-range communication such as Bluetooth.

Also, the controller 130 may be paired with the external wireless earphone through a short-range communication module so as to output a sound.

For example, on the basis of information about the image and/or sound of the user's communication terminal received through short-range communication, the controller 130 may output an image of the communication terminal through the multi-image display device 110 and/or may output a sound of the communication terminal through a speaker of the vehicle or an external wireless earphone.

For example, the controller 130 may output an image associated with a driving situation or an image associated with navigation information in a direction of the driver seat of the vehicle through the multi-image display device 110.

For example, the controller 130 may output an entertainment-related image in a direction toward the first reflection member 120 through the multi-image display device 110.

The controller 130 may provide information about a driving situation or road situation to the driver, which is driving a vehicle at the driver seat, by outputting the image associated with the driving situation or the image associated with the navigation information in the direction of the driver seat of the vehicle through the multi-image display device 110; at the same time, the controller 130 may provide media content to a rear seat passenger through an image by outputting an entertainment-related image in a direction toward the first reflection member 120.

As another example, the controller 130 may be connected via Bluetooth to the communication terminal of a passenger (a driver or a passenger) so as to output one or more of a mirrored image, an image pre-stored in a vehicle, an image stored in a terrestrial digital multimedia broadcasting (DMB) or digital versatile disk (DVD), and a removable storage device, through the multi-image display device 110.

In this case, the controller 130 may receive image information through Bluetooth communication connected to the user's communication terminal or may receive terrestrial DMB through a DMB communication module.

Furthermore, the controller 130 may be connected, in advance, to an embedded image memory built in the vehicle or a removable storage device connected to the vehicle so as to receive information about the embedded image or the image stored in the removable storage device.

For example, the first reflection member 120 may include a color-changeable film.

The color-changeable film may be controlled by the controller 130 and may be changed into various colors depending on a control signal from the controller 130.

For example, when an image reflected on the first reflection member 120 through the multi-image display device 110 is output, the controller 130 may control the color of the first reflection member 120 to be changed to a predetermined color.

The controller 130 may control the color of the first reflection member 120 to be changed to a predetermined color such that a user is capable of immersing in content through an image reflected on the first reflection member 120.

Figure 2:
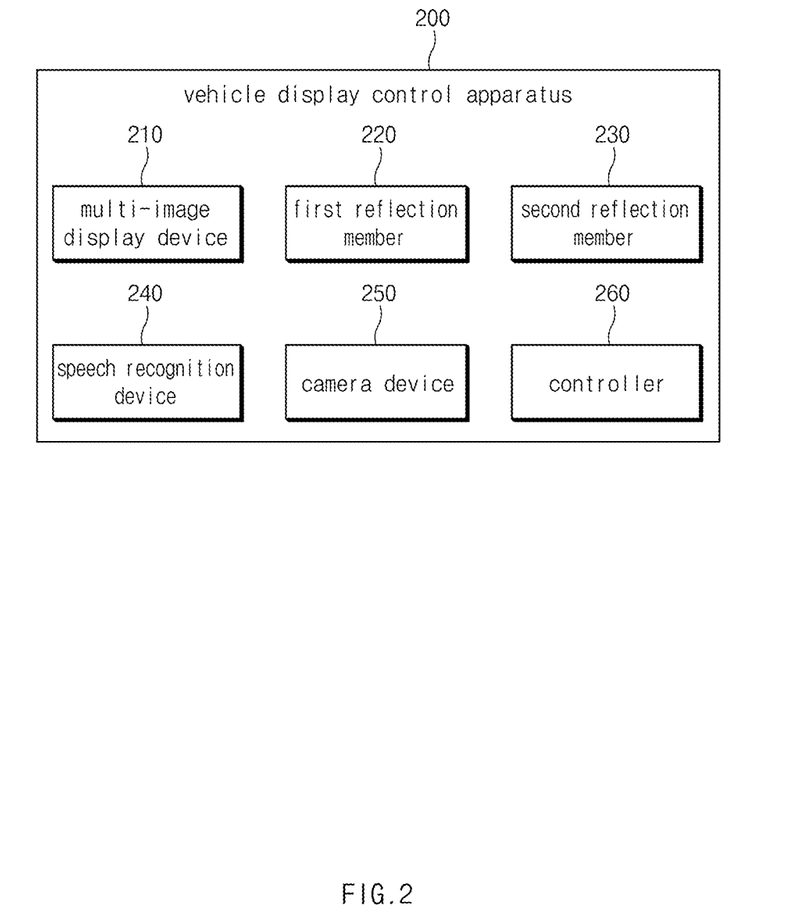
FIG. 2 is a block diagram specifically illustrating a vehicle display control apparatus, according to an embodiment of the present disclosure.

FIG. 2 is a block diagram specifically illustrating a vehicle display control apparatus, according to an embodiment of the present disclosure.

Referring to FIG. 2, a vehicle display control apparatus 200 may include a multi-image display device 210, a first reflection member 220, a second reflection member 230, a speech recognition device 240, a camera device 250, and a controller 260.

The multi-image display device 210, the first reflection member 220, and the controller 260, which are included in the vehicle display control apparatus 200 shown in FIG. 2, may be configured to perform the functions/operations described for the multi-image display device 110, the first reflection member 120, and the controller 130, which are included in the vehicle display control apparatus 100 illustrated in FIG. 1.

The first reflection member 230 may be provided on a windshield of the vehicle such that one image among two or more images output from the multi-image display device 210 is capable of being reflected.

For example, the second reflection member 230 may include a transmissive HOE film.

The speech recognition device 240 may be provided in the vehicle so as to recognize a user's voice.

For example, the speech recognition device 240 may include a microphone. The speech recognition device 240 may recognize a sound inside a vehicle through the microphone and then may transmit the recognized sound to the controller 260.

The controller 260 may control the multi-image display device 210 in response to the recognized voice.

For example, the controller 260 may generate a command corresponding to the obtained voice through artificial intelligence (AI)-based speech recognition learning model thus learned in advance. The controller 260 may control the multi-image display device 210 depending on the generated command.

The camera device 250 may be provided in the vehicle so as to capture an image including a user's gesture.

For example, the camera device 250 may include one or more cameras that capture an image including a gesture of a driver at the driver seat of the vehicle and/or a passenger at the rear seat, and may deliver the captured image to the controller 260.

The controller 260 may control the multi-image display device 210 in response to a gesture recognized through the captured image.

For example, through the AI-based gesture recognition learning model thus learned in advance, the controller 260 may recognize a gesture corresponding to the captured image or may generate a command corresponding to the gesture. The controller 260 may control the multi-image display device 210 depending on the generated command.

When a vehicle is autonomously driving or is stopped, the controller 260 may tilt the multi-image display device 210 such that one of two or more images is reflected on the second reflection member 230.

For example, through the autonomous driving system or the vehicle's drive system, the controller 260 may obtain information about whether the vehicle is autonomously driving or whether the vehicle is stopped.

For example, when a vehicle is autonomously driving or is stopped, the controller 260 may tilt the multi-image display device 210 based on a predetermined angle such that one of two or more images is reflected on the second reflection member 230.

Figure 3:
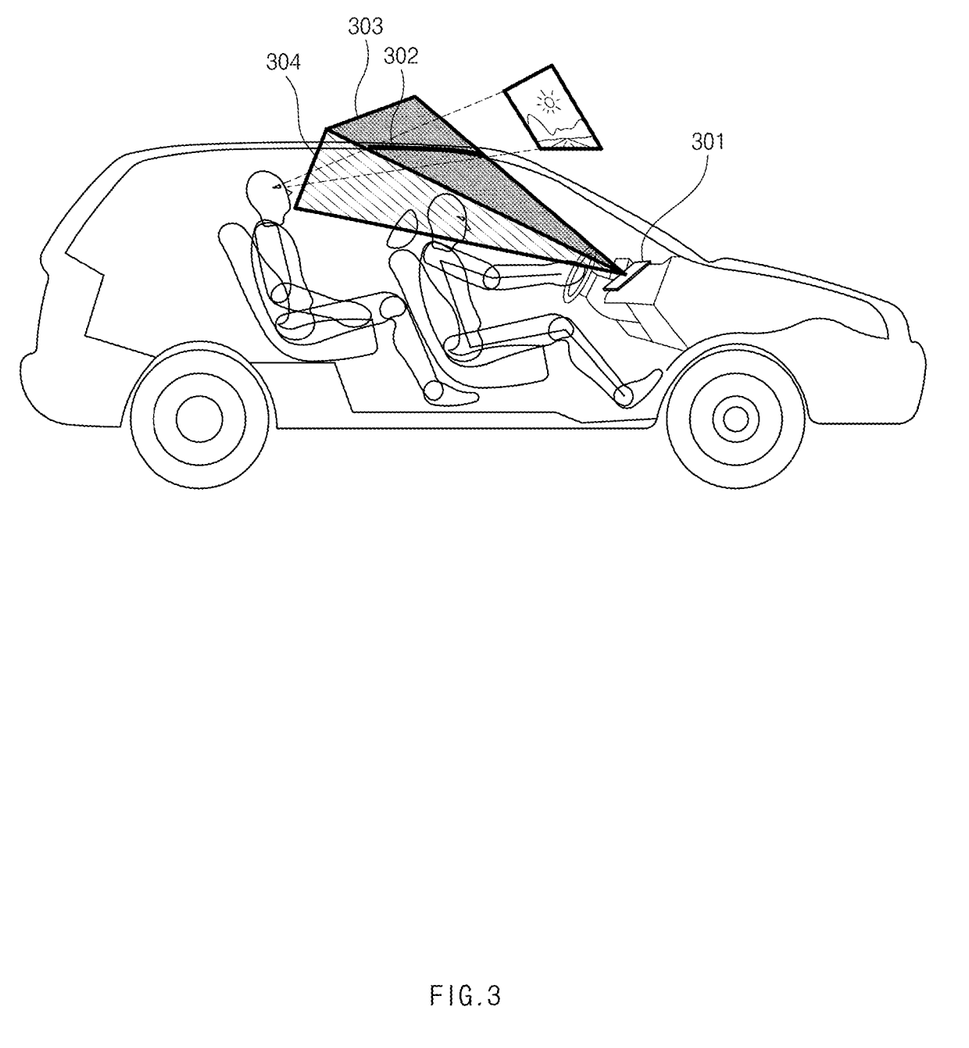
FIG. 3 is a view illustrating that a vehicle display control apparatus outputs an image, according to an embodiment of the present disclosure.

FIG. 3 is a view illustrating that a vehicle display control apparatus outputs an image, according to an embodiment of the present disclosure.

Referring to FIG. 3, a multi-image display device 301 provided in a center fascia of a vehicle may output two separate images having different visible areas depending on an angle or an optical frequency.

Moreover, the vehicle may be provided with a first reflection member 302 in an indoor ceiling.

The multi-image display device 301 may output two images separated into a virtual display transmission area 303 and an AVN intuitive sight area 304.

The virtual display transmission area 303 may include an area based on an angle at which an image is transmitted in a direction toward the first reflection member 302.

An image output from the multi-image display device 301 to the virtual display transmission area 303 may be reflected by the first reflection member 302 and may be delivered to the sight of a passenger located at a rear seat of the vehicle.

An image output from the multi-image display device 301 to the virtual display transmission area 303 may be reflected by the first reflection member 302 and may be enlarged at the same time, such that the passenger located at a rear seat is capable of watching the enlarged image.

The AVN intuitive sight area 304 may include an area based on an angle at which an image is capable of being directly transmitted to the sight of a driver located at the driver seat.

Although the reference characters in FIG. 3 described above and the reference characters in FIG. 4 to be described below are different from those in FIG. 1 or FIG. 2, one of ordinary skill in the art should understand that the descriptions of FIG. 1 and/or FIG. 2 regarding the functions/operations of the various elements thereof can also be applied to the embodiments shown in FIG. 3 and FIG. 4. Such detailed descriptions are omitted to avoid redundancy.

Figure 4:
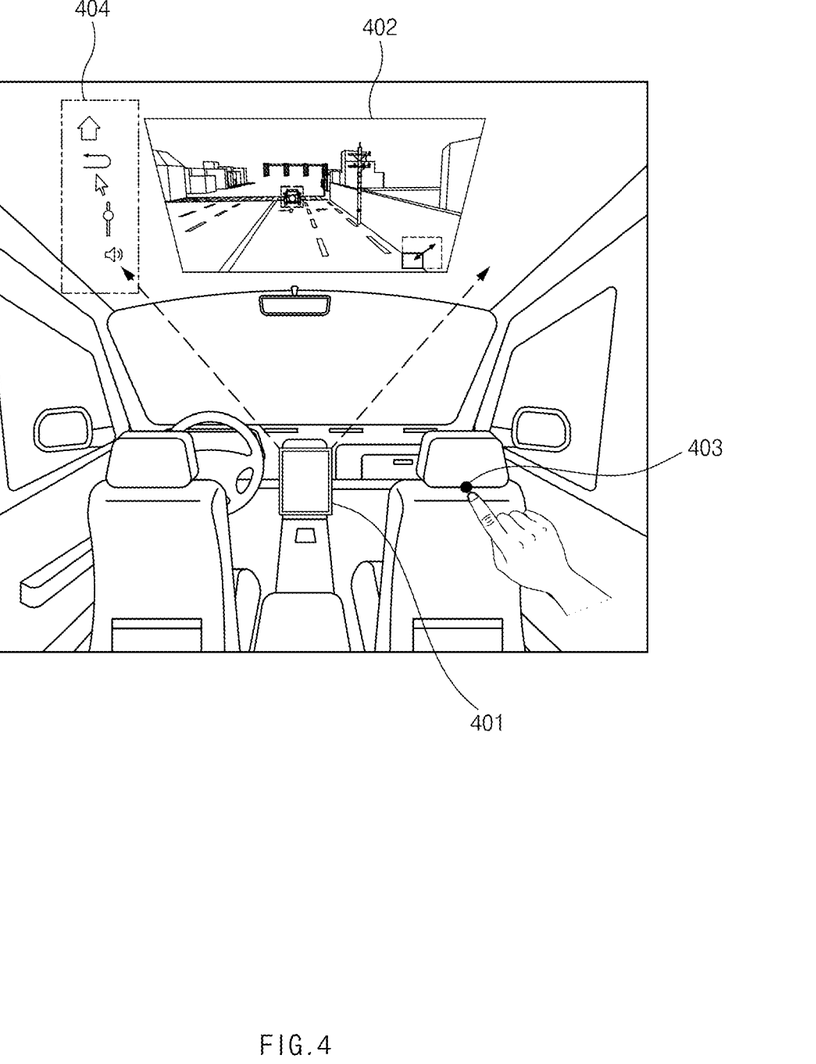
FIG. 4 is a diagram illustrating that a vehicle display control apparatus recognizes a user's gesture to control a multi-image display device, according to an embodiment of the present disclosure.

FIG. 4 is a diagram illustrating that a vehicle display control apparatus recognizes a user's gesture to control a multi-image display device, according to an embodiment of the present disclosure.

Referring to FIG. 4, a multi-image display device 401 may be included in an AVN screen of a vehicle. The multi-image display device 401 may output an image that is reflected through a first reflection member 402 provided in an indoor ceiling of the vehicle and is delivered to the sight of a rear seat passenger.

Besides, the vehicle display control apparatus (100, 200) may obtain an image including a user's gesture through a gesture recognition camera 403 included in the camera device 250.

For example, the gesture recognition camera 403 may be mounted on a back surface of a driver seat or a passenger seat so as to obtain an image including the gesture of the rear seat passenger.

The multi-image display device 401 may be reflected through the first reflection member 402 and may output a menu icon 404 corresponding to the control of the multi-image display device 401 together with the image.

The menu icon 404 corresponding to the control of the multi-image display device 401 may include an icon corresponding to the control including one or more of home, back, and volume adjustment.

The vehicle display control apparatus (100, 200) may control the multi-image display device 401 in response to the detected gesture by analyzing an image obtained through the gesture recognition camera 403.

For example, the vehicle display control apparatus (100, 200) may control movement and selection of a cursor in an image output through the multi-image display device 401 in response to the detected gesture.

Although not illustrated in drawings, for example, the vehicle display control apparatus (100, 200) may control the multi-image display device 401 by recognizing a user's voice and linking the recognized sound with the recognized gesture.

Figure 5A:
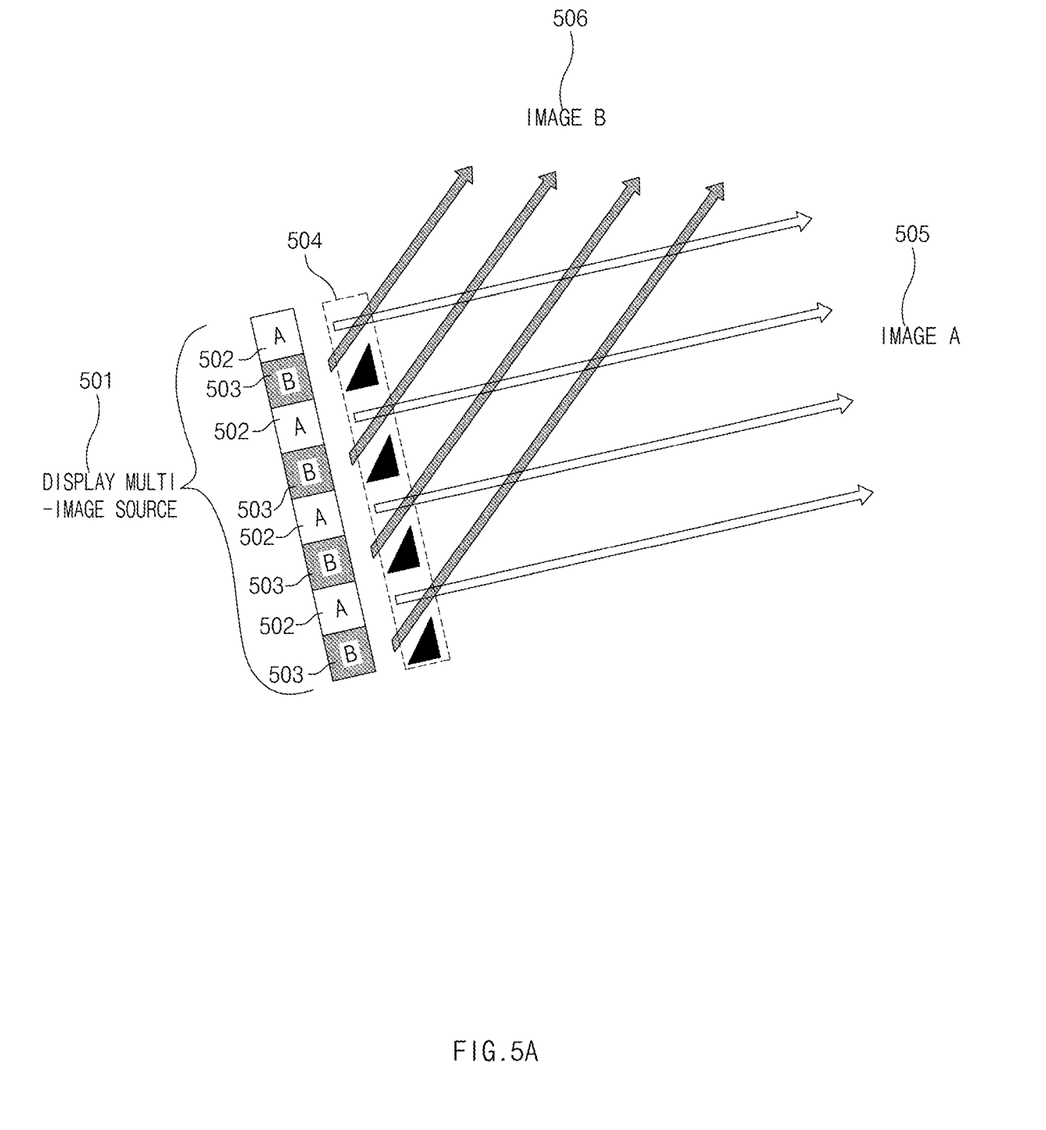
FIG. 5A is a diagram illustrating that a multi-image display device outputs two or more images according to an angle, according to an embodiment of the present disclosure.

FIG. 5A is a diagram illustrating that a multi-image display device outputs two or more images according to an angle, according to an embodiment of the present disclosure.

Referring to FIG. 5A, the multi-image display device (110, 210) may include a display multi-image source 501 and a phase separation barrier film 504.

The phase separation barrier film 504 may be disposed in a direction, in which light is output from the display multi-image source 501, such that an image output from the display multi-image source 501 passes through the phase separation barrier film 504.

The phase separation barrier film 504 may be configured such that light incident on a specific portion is refracted and transmitted at a predetermined angle, and light incident on another portion is transmitted straightly without being refracted.

The display multi-image source 501 may include an image source A 502 and an image source B 503.

The image source A 502 may output an image A 505. The image source B 503 may output an image B 506.

For example, the image source A 502 and the image source B 503 may be alternately arranged one by one horizontally on the multi-image display device (110, 120).

For example, the image A 505 output through the image source A 502 may pass through the phase separation barrier film 504 without being reflected from the phase separation barrier film 504 and then may be output without being refracted.

For example, the image B 506 output through the image source B 503 may be refracted by being reflected from the phase separation barrier film 504 and thus may be output at different angles.

Figure 5B:
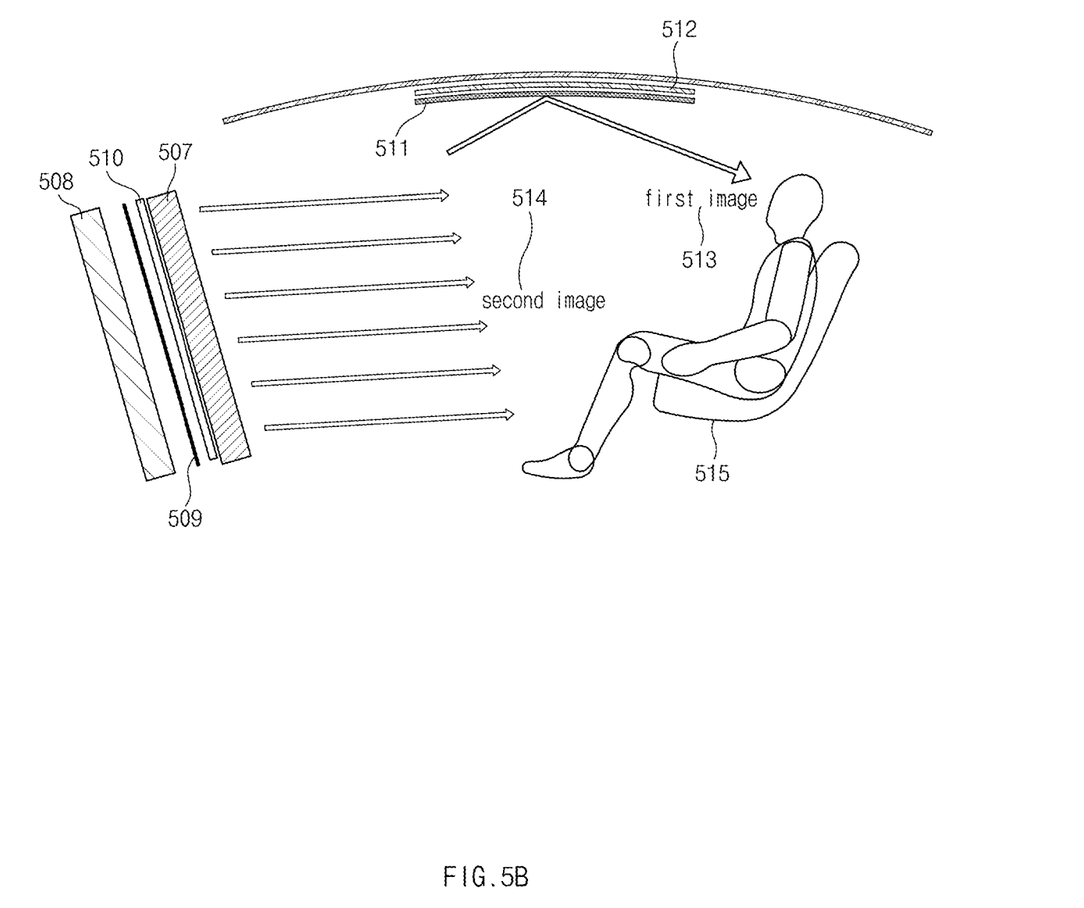
FIG. 5B is a diagram illustrating that a multi-image display device outputs two or more images by using a transparent display, according to an embodiment of the present disclosure.

FIG. 5B is a diagram illustrating that a multi-image display device outputs two or more images by using a transparent display, according to an embodiment of the present disclosure.

Referring to FIG. 5B, the multi-image display device (110, 210) may include a first display 507, a second display 508, an LCF 509, and a transparent light guide plate 510.

The first display 507 may be transparent, and a polarizing film may be removed from the first display 507. The first display 507 may output a first image 513.

For example, the first display 507 may include a transparent liquid crystal display (LCD) from which a polarizing film is removed.

The second display 508 may be positioned on the back surface of the first display 507 so as to output a second image 514.

For example, the second display 508 may include an LCD.

The LCF 509 may be interposed between the first display 507 and the second display 508. The LCF 509 may control a direction, in which the second image 514 is output, such that the second image 514 output from the second display 508 faces in towards a specific direction.

For example, the LCF 509 may control a direction, in which the second image 514 is output, such that the second image 514 output from the second display 508 faces in a direction other than a direction toward the first reflection member (120, 220). Accordingly, the LCF 509 may prevent the second image 514 from being reflected by the first reflection members 120 and 220.

The transparent light guide plate 510 may maintain the transparency of the second image 514 and may operate as a back light unit (BLU) of the first display 507.

For example, when the first image 513 is reflected through the first reflection member (120, 220), the transparent light guide plate 510 may increase the brightness of the first image 513.

The first reflection member (120, 220) may include a polarizing film 511 and an HOE film 512.

The polarizing film 511 may selectively reflect one of the first image 513 and the second image 514.

For example, the polarizing film 511 may form an image at a specific frequency.

For example, the polarizing film 511 may be configured to selectively reflect only the first image 513 such that the first image 513 reaches the rear seat passenger 515.

The HOE film 512 may enlarge the reflected image.

Figure 6:
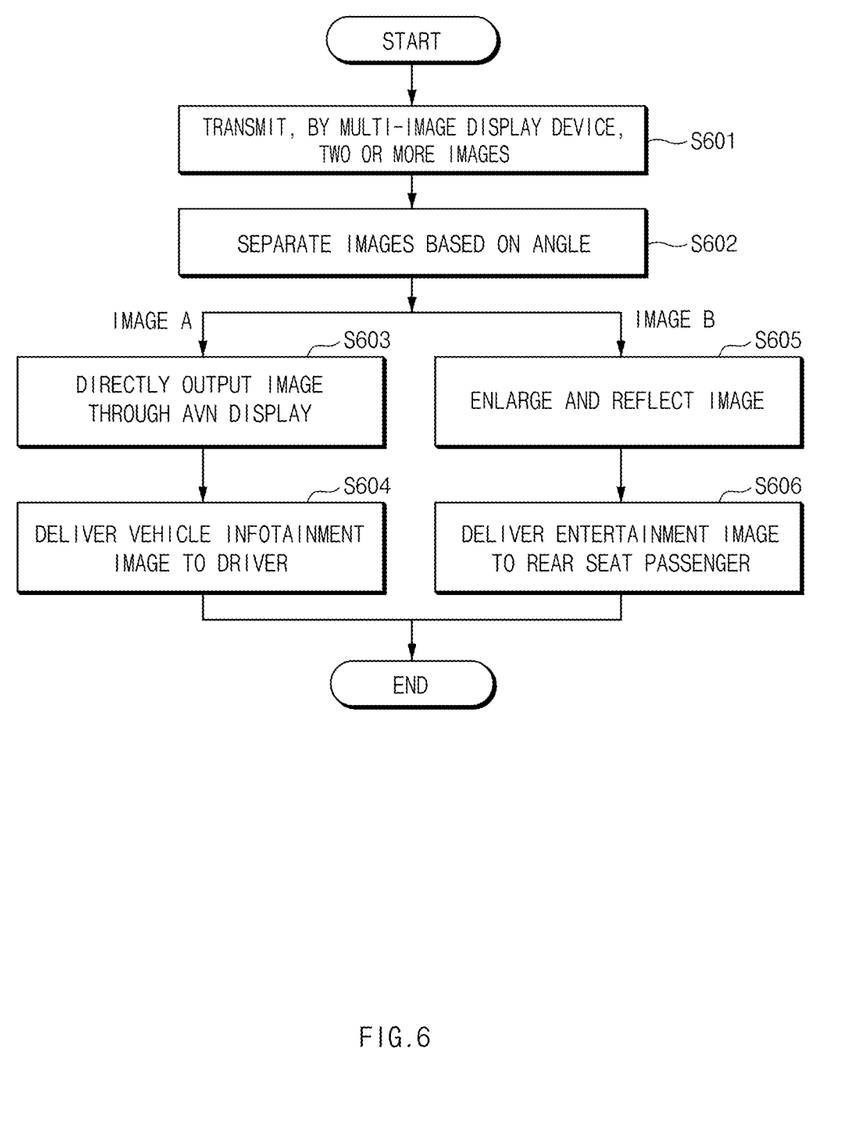
FIG. 6 is a flowchart illustrating a process, in which an image output from a vehicle display control apparatus is delivered to a user, according to an embodiment of the present disclosure.

In this drawing, it is illustrated that the first image 513 output from the first display 507 is reflected through the polarizing film 511 and the HOE film 512 to reach the rear seat passenger 515. However, in another embodiment, an embodiment of the present disclosure may be implemented such that the second image 514 output from the second display 508 is reflected through the polarizing film 511 and the HOE film 512 to reach the rear seat passenger 515. FIG. 6 is a flowchart illustrating a process, in which an image output from a vehicle display control apparatus is delivered to a user, according to an embodiment of the present disclosure.

Referring to FIG. 6, the multi-image display device (110, 210) may transmit two or more images (S601).

For example, the multi-image display device (110, 210) may output the image A and the image B, which are separated from each other, through an image source corresponding thereto.

The multi-image display device (110, 210) may transmit the two or more images (S601) and then may separate images so that the images are transmitted in different angles (S602), to allow viewers, such as a driver and a rear seat passenger having different view angles with respect to the multi-image display device, to respectively view the corresponding images.

For example, the multi-image display device (110, 210) may separate the images based on the angle through a phase separation barrier film.

The multi-image display device (110, 210) may separate the images based on the angle (S602), and the image A may be directly output through an AVN display (S603).

For example, the image A may pass through the phase separation barrier film and may go straight through the AVN display without being refracted. Finally, the image A may be directly output to the sight of a driver.

The image A may be directly output through the AVN display (S603), and a vehicle infotainment image may be delivered to the sight area of a driver (S604).

For example, the image A may be delivered to the sight area of the driver, and thus may include an image associated with vehicle infotainment including information necessary for driving.

After the multi-image display device (110, 210) separate the images based on an angle (S602), the image B may be enlarged and reflected (S605).

For example, the image B may pass through the phase separation barrier film, may be refracted, and may be output in a direction toward the first reflection members 120 and 220 provided in an indoor ceiling of the vehicle.

For example, the first reflection members 120 and 220 may enlarge and reflect the image B.

After the image B is enlarged and reflected (S605), an entertainment image may be delivered to a rear seat passenger (S606).

For example, the image B reflected by the first reflection member (120, 220) may be delivered to the sight area of the rear seat passenger.

For example, the image B may be delivered to the sight area of the rear seat passenger, and thus the image B may include an image associated with entertainment for the passenger's interest during driving.

For example, the image B may be reflected by the first reflection member (120, 220) and then may be delivered to a passenger, and thus inversion and distortion of an image may occur in a process of reflecting and refracting the image B. Accordingly, this correction process may be performed through the multi-image display device (110, 210).

Figure 7:
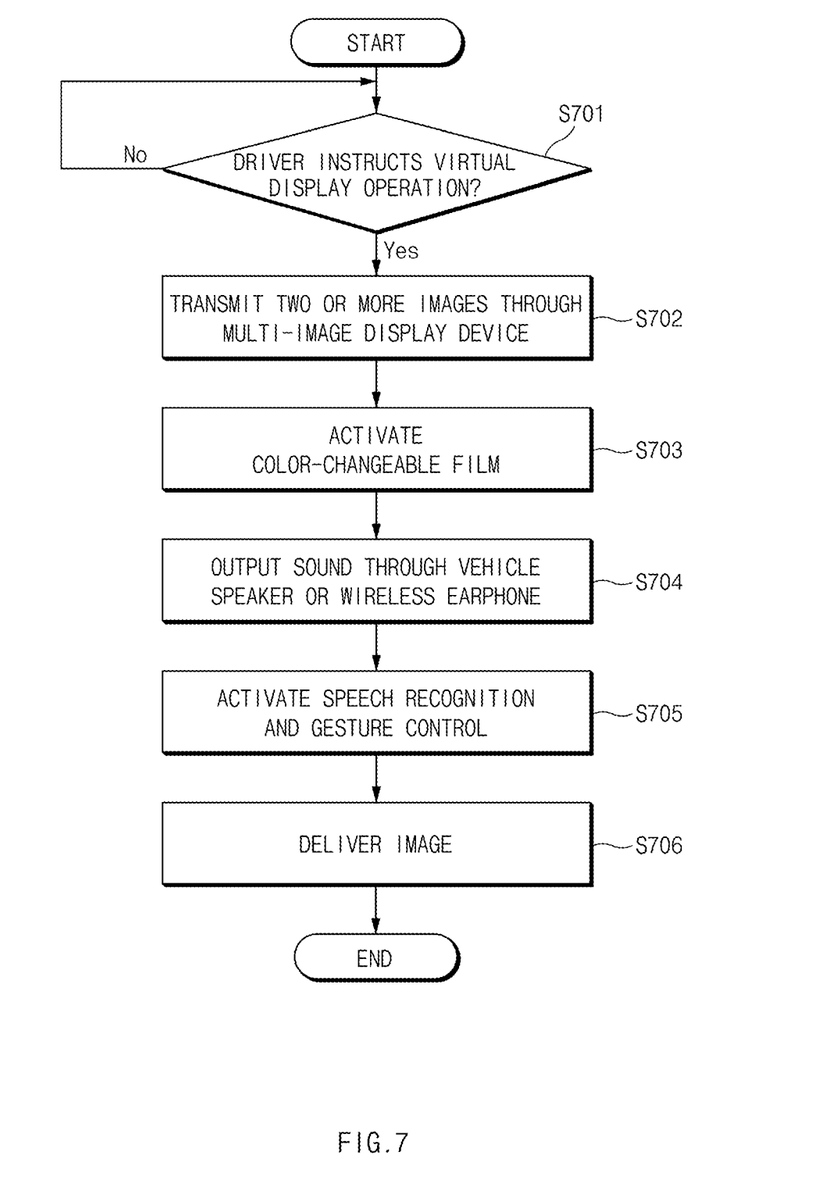
FIG. 7 is a flowchart illustrating a process, in which a vehicle display control apparatus outputs an image during driving, according to an embodiment of the present disclosure.

FIG. 7 is a flowchart illustrating a process, in which a vehicle display control apparatus outputs an image during driving, according to an embodiment of the present disclosure.

Referring to FIG. 7, the vehicle display control apparatus (100, 200) may determine whether a driver instructs a virtual display operation (S701).

For example, the vehicle display control apparatus (100, 200) may determine whether the driver instructs the virtual display operation, through speech recognition, gesture recognition, and/or a separate user interface.

The vehicle display control apparatus (100, 200) may determine whether the driver instructs the virtual display operation (S701). When it is determined that the driver does not instruct the virtual display operation, a procedure may return to s701 again and then the vehicle display control apparatus (100, 200) may continue to determine whether the driver instructs the virtual display operation.

The vehicle display control apparatus (100, 200) may determine whether the driver instructs the virtual display operation (S701). When it is determined that the driver instructs the virtual display operation, the vehicle display control apparatus (100, 200) may transmit two or more images through the multi-image display device (110, 120) (S702).

For example, when it is determined that the driver instructs the virtual display operation, the vehicle display control apparatus (100, 200) may transmit two or more images, which are separated depending on an angle or an optical frequency, through the multi-image display device (110, 120).

The vehicle display control apparatus (100, 200) may transmit the two or more images through the multi-image display device (110, 120) (S702), and then may activate a color-changeable film (S703).

For example, the vehicle display control apparatus (100, 200) may control the color of the color-changeable film to be changed to a predetermined color such that a passenger is capable of concentrating in a process of watching image content.

After activating the color-changeable film (S703), the vehicle display control apparatus (100, 200) may output a sound through a vehicle speaker or a wireless earphone (S704).

For example, the vehicle display control apparatus (100, 200) may transmit the two or more images through the multi-image display device (110, 120), and may output a sound, which corresponds to the transmitted image, through the vehicle speaker or wireless earphone.

The vehicle display control apparatus 100 and 200 may output a sound through the vehicle speaker or wireless earphone (S704), and then may activate speech recognition and gesture control (S705).

For example, the vehicle display control apparatus (100, 200) may activate speech recognition and gesture control such that a rear seat passenger is capable of controlling an image output from the multi-image display device (110, 120) through speech recognition and gesture control.

Herein, a process of s703 to s705 may be performed in an arbitrary order other than the illustrated order, according to an embodiment.

Furthermore, when an emergency occurs in a state where the vehicle is autonomously driving while a processes of s702 to s706 is performed, the vehicle display control apparatus (100, 200) may deactivate the output of the image reflected by a first reflection member.

The vehicle display control apparatus 100 and 200 may activate speech recognition and gesture control (S705) and may deliver an image to a user (S706).

For example, the vehicle display control apparatus (100, 200) may deliver an image reflected by the first reflection member (120, 220) provided in an indoor ceiling of the vehicle to a rear seat passenger.

Figure 8:
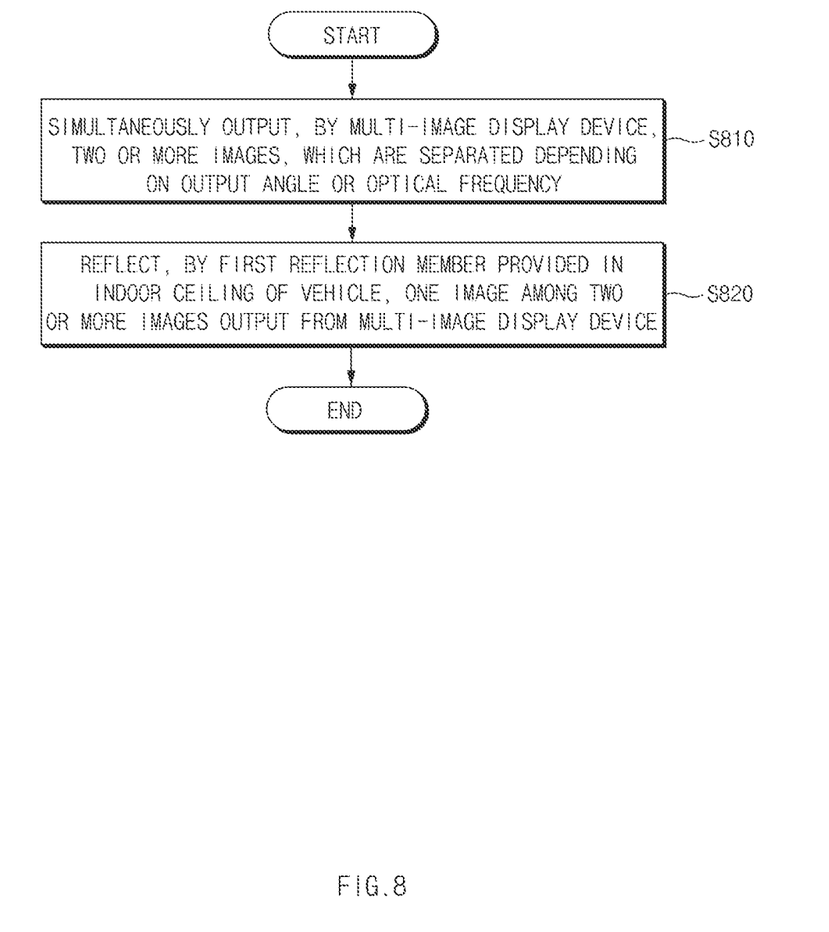
FIG. 8 is a flowchart illustrating a vehicle display controlling method, according to an embodiment of the present disclosure.

FIG. 8 is a flowchart illustrating a vehicle display controlling method, according to an embodiment of the present disclosure.

Referring to FIG. 8, a vehicle display controlling method may include step s810 of simultaneously outputting, by the multi-image display device (110, 120), two or more images, which are separated depending on an output angle or an optical frequency to two or more locations, respectively and step s820 of reflecting, by the first reflection member (120, 220) provided in an indoor ceiling of a vehicle, one image among the two or more images output from the multi-image display device (110, 120).

Step s810 of simultaneously outputting, by the multi-image display device (110, 120), the two or more images, which are separated depending on the output angle or the optical frequency may be performed through a multi-image source and a phase separation barrier film, which are included in the multi-image display device (110, 120) by the control signal of the controller (130, 260).

For example, step s810 of simultaneously outputting, by the multi-image display device (110, 120), the two or more images, which are separated depending on the output angle or the optical frequency may include outputting, by the multi-image display device (110, 120), an image associated with a driving situation or an image associated with navigation information in a direction of a driver seat of the vehicle, and outputting, by the multi-image display device (110, 120), an entertainment-related image in a direction toward the first reflection member (120, 220).

Step S820 of reflecting, by the first reflection member (120, 220) provided in an indoor ceiling of a vehicle, the one image among the two or more images output from the multi-image display device (110, 120) may be performed such that the reflected image is delivered to a rear seat passenger.

Although not illustrated in drawings, the vehicle display controlling method may further include deactivating, by the controller (130, 260), the output of an image, which is reflected on the first reflection member (120, 220), from among the two or more images when it is detected that an emergency occurs while the vehicle is autonomously driving.

For example, the vehicle display controlling method may further include deactivating, by the controller (130, 260), an output of an image, which is reflected on the first reflection member (120, 220), from among the two or more images based on a time remaining to a destination while the vehicle is driving.

For example, the vehicle display controlling method may further include recognizing, by the speech recognition device 240 provided in the vehicle, a voice of a user and controlling, by the controller (130, 260), the multi-image display device (110, 120) in response to the recognized voice.

For example, the vehicle display controlling method may further include capturing, by the camera device 250 provided in the vehicle, an image including a gesture of a user and controlling, by the controller (130, 260), the multi-image display device (110, 120) in response to the gesture recognized through the image.

For example, the vehicle display controlling method may further include outputting an image of a communication terminal through the multi-image display device (110, 120) while the controller (130, 260) is paired with a user's communication terminal and outputting, by the controller (130, 260), a sound of the communication terminal through a speaker of the vehicle or an external wireless earphone.

For example, the vehicle display controlling method may further include tilting, by the controller (130, 260), the multi-image display device (110, 120) such that the one image among the two or more images is reflected on the second reflection member, when the vehicle is autonomously driving or is stopped and reflecting, by the second reflection member 230, the one image among the two or more images output from the multi-image display device (110, 120).

For example, the vehicle display controlling method may further include controlling, the controller (130, 260), the color of the first reflection member (120, 220) to be changed to a predetermined color when an image reflected on the first reflection member (120, 220) through the multi-image display device (110, 120) is output.

The operations of the method or algorithm described in connection with the embodiments disclosed in the specification may be directly implemented with a hardware module, a software module, or a combination of the hardware module and the software module, which is executed by the processor. The software module may reside on a storage medium (i.e., the memory and/or the storage) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The software module, when executed by the controller which includes a processor, may cause the controller to pertain the above-described functions/operations.

The exemplary storage medium may be coupled to the processor. The processor may read out information from the storage medium and may write information in the storage medium. Alternatively, the storage medium may be integrated with the processor. The processor and storage medium may be implemented with an application specific integrated circuit (ASIC). The ASIC may be provided in a user terminal. Alternatively, the processor and storage medium may be implemented with separate components in the user terminal.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

Descriptions of a vehicle display control apparatus according to an embodiment of the present disclosure, and a method thereof are as follows.

According to at least one of embodiments of the present disclosure, an apparatus for controlling a multi-image display provided in a vehicle, and a method thereof.

Furthermore, according to at least one of embodiments of the present disclosure, it is possible to provide a vehicle display control apparatus that increases driving satisfaction of a rear seat passenger by providing an image to the rear seat passenger of a vehicle without providing a display on a back surface of a front seat headrest of the vehicle, and a method thereof.

Moreover, according to at least one of embodiments of the present disclosure, it is possible to provide a vehicle display control apparatus that increases interior openness depending on future mobility trends and provides image content, and a method thereof.

Besides, according to at least one of embodiments of the present disclosure, it is possible to provide a vehicle display control apparatus that provides an image to a rear seat passenger by using a multi-image display without adding additional hardware, and a method thereof.

Also, according to at least one of embodiments of the present disclosure, it is possible to provide a vehicle display control apparatus that expands entertainment elements during driving by outputting an image capable of being viewed by a rear seat passenger inside a vehicle, and a method thereof.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle display control apparatus, the apparatus comprising:
   a multi-image display device provided in a vehicle and configured to simultaneously output two or more images separated depending on an output angle or an optical frequency to two or more locations, respectively;
   a first reflection member provided in an indoor ceiling of the vehicle and configured to reflect one image among the two or more images output from the multi-image display device;
   a second reflection member provided in a windshield of the vehicle and configured to reflect the one image among the two or more images output from the multi-image display device; and
   a controller configured to control the multi-image display device, and tilt the multi-image display device such that the one image among the two or more images is reflected on the second reflection member when the vehicle is autonomously driving or is stopped.

2. The apparatus of claim 1, wherein the first reflection member includes a transmissive holographic optical element (HOE) film.

3. The apparatus of claim 1, wherein the multi-image display device includes a barrier for separating the two or more images, which are output, depending on the angle.

4. The apparatus of claim 1, wherein the multi-image display device includes:
   a first display without a polarizing film, which is transparent, configured to output a first image;
   a second display positioned on a back surface of the first display and configured to output a second image; and
   a light control film (LCF) interposed between the first display and the second display,
   wherein the first reflection member includes a polarizing film for selectively reflecting one image among the first image and the second image.

5. The apparatus of claim 1, wherein the controller deactivates an output of an image, which is reflected on the first reflection member, from among the two or more images when an emergency is detected while the vehicle is autonomously driving.

6. The apparatus of claim 1, wherein the controller deactivates an output of an image, which is reflected on the first reflection member, from among the two or more images based on a time remaining to a destination while the vehicle is driving.

7. The apparatus of claim 1, further comprising:
   a speech recognition device provided in the vehicle and configured to recognize a voice of a user,
   wherein the controller controls the multi-image display device in response to the recognized voice.

8. The apparatus of claim 1, further comprising:
a camera device provided in the vehicle and configured to capture an image including a gesture of a user,
wherein the controller controls the multi-image display device in response to the gesture recognized through the image.

9. The apparatus of claim 1, wherein the controller is paired with a communication terminal of a user and outputs content provided by the communication terminal through the multi-image display device, and outputs a sound corresponding to a sound signal provided by the communication terminal through a speaker of the vehicle or an external wireless earphone.

10. The apparatus of claim 1, wherein the controller outputs:
an image associated with a driving situation or an image associated with navigation information in a direction of a driver seat of the vehicle through the multi-image display device, and
an entertainment-related image in a direction toward the first reflection member through the multi-image display device.

11. The apparatus of claim 1, wherein the controller outputs one or more of images mirrored with a communication terminal of a user, an embedded image embedded in advance in the vehicle, a terrestrial digital multimedia broadcasting (DMB) image, or an image stored in a removable storage device connected to the vehicle through the multi-image display device.

12. The apparatus of claim 1, wherein the first reflection member includes a color-changeable film, and
wherein the controller controls the color-changeable film to change a color of the first reflection member to a predetermined color when an image reflected on the first reflection member through the multi-image display device is output.

13. A vehicle display controlling method, the method comprising:
simultaneously outputting, by a multi-image display device that is provided in a vehicle and is controlled by a controller, two or more images, which are separated depending on an output angle or an optical frequency to two or more locations, respectively; and
reflecting, by a first reflection member provided in an indoor ceiling of the vehicle, one image among the two or more images output from the multi-image display device;
tilting, by the controller, the multi-image display device such that the one image among the two or more images is reflected on a second reflection member, when the vehicle is autonomously driving or is stopped; and
reflecting, by the second reflection member, the one image among the two or more images output from the multi-image display device.

14. The method of claim 13, further comprising:
deactivating, by the controller, an output of an image, which is reflected on the first reflection member, from among the two or more images when an emergency is detected while the vehicle is autonomously driving.

15. The method of claim 13, further comprising:
deactivating, by the controller, an output of an image, which is reflected on the first reflection member, from among the two or more images based on a time remaining to a destination while the vehicle is driving.

16. The method of claim 13, further comprising:
recognizing, by a speech recognition device provided in the vehicle, a voice of a user; and
controlling, by the controller, the multi-image display device in response to the recognized voice.

17. The method of claim 13, further comprising:
capturing, by a camera device provided in the vehicle, an image including a gesture of a user; and
controlling, by the controller, the multi-image display device in response to the gesture recognized through the image.

18. The method of claim 13, wherein the simultaneously outputting, by the multi-image display device, the two or more images separated depending on the output angle or the optical frequency includes:
outputting, by the multi-image display device, an image associated with a driving situation or an image associated with navigation information in a direction of a driver seat of the vehicle; and
outputting, by the multi-image display device, an entertainment-related image in a direction toward the first reflection member.

19. A vehicle display control apparatus, the apparatus comprising:
a multi-image display device provided in a vehicle and configured to simultaneously output two or more images separated depending on an output angle or an optical frequency to two or more locations, respectively;
a first reflection member provided in an indoor ceiling of the vehicle and configured to reflect one image among the two or more images output from the multi-image display device; and
a controller configured to control the multi-image display device,
wherein the multi-image display device includes:
a first display without a polarizing film, which is transparent, configured to output a first image;
a second display positioned on a back surface of the first display and configured to output a second image; and
a light control film (LCF) interposed between the first display and the second display,
wherein the first reflection member includes a polarizing film for selectively reflecting one image among the first image and the second image.

* * * * *